(12) United States Patent
Hartman (10) Patent No.: US 8,621,811 B2
(45) Date of Patent: Jan. 7, 2014

(54) THERMOPLASTIC SIDING INSULATION

(76) Inventor: Steven David Hartman, Caledon (CA)

( * ) Notice: Subject to any disclaimer, the term of this patent is extended or adjusted under 35 U.S.C. 154(b) by 213 days.

(21) Appl. No.: 12/264,328

(22) Filed: Nov. 4, 2008

(65) Prior Publication Data

US 2009/0145065 A1 Jun. 11, 2009

Related U.S. Application Data

(60) Provisional application No. 60/986,882, filed on Nov. 9, 2007.

(51) Int. Cl.
*E04B 2/00* (2006.01)

(52) U.S. Cl.
USPC ............. 52/506.1; 52/309.8; 52/539; 52/541; 52/546

(58) Field of Classification Search
USPC ............... 52/530, 535, 536, 539, 555, 506.1, 52/309.4, 309.8, 309.9, 541, 546, 560; 264/45.5, 46.1
See application file for complete search history.

(56) References Cited

U.S. PATENT DOCUMENTS

| | | | |
|---|---|---|---|
| 2,990,651 A * | 7/1961 | Chalmers | 52/541 |
| 3,121,130 A * | 2/1964 | De Bell et al. | 264/53 |
| 3,573,152 A * | 3/1971 | Wiley | 428/114 |
| 3,720,572 A * | 3/1973 | Soda et al. | 428/218 |
| 3,881,984 A * | 5/1975 | Soda et al. | 156/500 |
| 4,034,528 A * | 7/1977 | Sanders et al. | 52/309.4 |
| 4,456,571 A * | 6/1984 | Johnson | 264/45.5 |
| 5,824,410 A * | 10/1998 | Sakai et al. | 428/361 |
| 6,177,180 B1 * | 1/2001 | Bodine et al. | 428/223 |
| 6,321,500 B1 * | 11/2001 | Manning et al. | 52/555 |
| 6,428,728 B1 * | 8/2002 | Sakai et al. | 264/171.13 |
| D471,292 S * | 3/2003 | Barber | D25/141 |
| 7,762,040 B2 * | 7/2010 | Wilson et al. | 52/748.1 |
| 2002/0029537 A1* | 3/2002 | Manning et al. | 52/518 |
| 2004/0150126 A1* | 8/2004 | Ide et al. | 264/46.1 |
| 2005/0081468 A1* | 4/2005 | Wilson et al. | 52/528 |
| 2006/0037268 A1* | 2/2006 | Mahaffey | 52/520 |
| 2006/0042183 A1* | 3/2006 | Benes | 52/741.1 |
| 2006/0080923 A1* | 4/2006 | Fleischhacker | 52/403.1 |
| 2007/0126142 A1* | 6/2007 | Zhou et al. | 264/134 |
| 2007/0193177 A1* | 8/2007 | Wilson et al. | 52/518 |
| 2008/0067709 A1* | 3/2008 | Galewski et al. | 264/53 |

* cited by examiner

*Primary Examiner* — Adriana Figueroa
(74) *Attorney, Agent, or Firm* — Eugene J. A. Gierczak (57) ABSTRACT

The present invention discloses an extruder for producing a thermoplastic material having a first and second portion comprising an axially extending barrel and a screw conveyer axially disposed within said barrel so as to define a passage for conveying thermoplastic material from an input through a melt zone to an output. Furthermore the present invention discloses an insulation member comprising an elongated insulation member formed of a thermoplastic insulating material, said insulating member having a top edge, a bottom edge, and first and second side edges; the top edge comprising a protrusion, said top edge extending beyond a corresponding top edge of a corresponding panel of siding; and the bottom edge comprising a ledge, said ledge operable to overlap the protrusion.

15 Claims, 5 Drawing Sheets

THERMOPLASTIC SIDING INSULATION

This application claims the benefit of U.S. Provisional Patent Application Ser. No. 60/986,882 filed on Nov. 9, 2007.

FIELD OF THE INVENTION

The present invention relates to thermoplastic siding insulation. More particularly, the present invention relates to a product for siding insulation formed of a shaped thermoplastic extrusion. The present invention also relates to a method for forming siding insulation comprising extruding the thermoplastic insulation from an extruder.

BACKGROUND OF THE INVENTION

The prior art discloses the use of backer insulation material on panel siding including vinyl, aluminum, steel; or other commonly used siding material. The prior art also discloses the use of various techniques of affixing backer insulation material to panel siding utilizing flexible and non-flexible adhesives.

Vinyl siding is generally made available in panels comprising longitudinally extending faces. For example, a single panel may represent two faces of a traditional wooden siding panel.

U.S. Pat. No. 4,506,486 to Culpepper et al. discloses a composite siding panel. The panel is comprised of a sheet metal or vinyl outer panel and an insulating member. The insulating member is adhesively bonded to the inner surface of the outer panel. Culpepper discloses the use of foamed insulating material.

U.S. Pat. No. 5,542,222 and corresponding continuation U.S. Pat. No. 6,195,952 to Wilson et al. discloses a corner post support member operable to adjoin two perpendicular panels of siding coming together at a corner. The corner post support member includes a space separating the outer panel of the member from the adjoining wall, said space filled with an insulating member in the nature of a polystyrene foam plastic or the like.

U.S. Pat. No. 6,029,415 and corresponding continuation U.S. Pat. No. 6,195,952 to Culpepper et al. discloses a composite interlocking vinyl or other veneer siding panel having an elongated insulating member bonded to a vinyl panel with a permanently flexible adhesive. It is claimed that the use of flexible adhesive is required because a hardened adhesive is not compatible with insulated siding panels since it does not take into account the effects of oil canning and telegraphing. Oil canning is a term for a phenomenon caused by expansion and contraction of vinyl siding. Vinyl exhibits a relatively high degree of expansion and contraction based on temperature changes, relative to similarly sized metal siding products. Prior art methods of insulation did not address the expansion and contraction requirements of vinyl siding. As a result, prior art methods of insulating vinyl siding had been known to buckle. Culpepper et al. introduced an insulating member having similar coefficients of expansion and contraction as vinyl, so that the siding presumably did not buckle. Telegraphing is a term for a phenomenon cause by the use of certain methods of applying adhesive to affix an insulating member to a siding panel. Where adhesive is applied in lines, rather than across the totality of the area where the surfaces of the insulation and panel are adjacent, the adhesive glue line can be seen under certain lighting conditions through the face of the panel. Culpepper et al. introduced a flexible adhesive that could be spread across the totality of the area of the insulation that is adjacent to the panel, so that telegraphing was presumably not a problem.

As mentioned above the insulating material disclosed in the prior art is an expanded polystyrene (EPS) foam more commonly known as beaded foam. However, this prior art foamed insulation is not impervious to moisture. This type of insulating foam is manufactured by using tiny beads of styrene impregnated with a foaming agent. Prior to forming the insulation the beads are typically expanded by aging them in air, allowing dispersion of the blowing agent. The beads are then placed in a mold and heated, causing the beads to fully expand and form the insulation. To minimize costs, a manufacturer typically uses the least number of beads possible that will expand to form the insulation. Thus each bead is relatively large when fully expanded and consequently there are large voids between the beads. These voids are known to collect moisture and bacteria, resulting in substantial rotting of the insulating material.

Furthermore, the use of a minimal number of beads results in a fragile product. During the manufacturing process, breakage of the fragile product causes beads to litter a manufacturing area resulting in time consuming cleanup and an environmental nuisance.

Finally, once the EPS foam insulation has been formed in a mold, a hot wire is used to burn the final shape required for the insulation material. This results in both open foam at the surfaces of the insulation and in significant smoke and air pollution.

Additionally, the method used by those skilled in the art to produce EPS foam insulation does not allow flexibility in panel lengths. As the profile of the insulation must be hot-wire cut from large blocks, there are limitations in the length of hot wire that can be used while retaining the ability to cut an accurate profile. Typically, an accurate profile can be made with hot wire of between 8 and 10 feet. However, the siding industry typically produces siding in 14 feet lengths, necessitating joining EPS insulation where EPS is used.

In view of the foregoing, what is needed is a foamed siding insulation that is less susceptible to moisture collection than the prior art siding insulation materials.

What is also needed is a foamed siding insulation material that is stronger than EPS and whose break-up does not result in messy, costly, and environmentally unfriendly debris.

Also there is a need to provide a foamed insulating material that can be sized easily to any profile and any length as needed rather than relying on sizes supplied by the manufacturer due to the limitations of the EPS manufacturing process.

SUMMARY OF THE INVENTION

An extruder for producing a thermoplastic material is provided, said extruder comprising an axially extending barrel and a screw conveyer axially disposed within said barrel so as to define a passage for conveying thermoplastic material from an input through a melt zone to an output, said output comprising a plurality of holes defining a siding profile.

Additionally, a method for producing a thermoplastic siding insulation member is provided, said method comprising introducing a plurality of solid thermoplastic pellets to an inlet of an axially extending barrel; conveying said solid thermoplastic pellets along said barrel using a means of conveyance comprising a screw conveyor axially disposed within said barrel; melting said solid thermoplastic pellets along a portion of said barrel having a temperature greater than the melting point of said thermoplastic; further conveying said thermoplastic melt along said barrel using the means of conveyance to an output, said output comprising a plurality of holes arranged in a manner to permit an extruded substance to assume a predetermined shape, said shape being the cross section of a siding insulation panel; extruding said thermoplastic melt from the output in a continuous manner; and permitting said extruded thermoplastic melt to solidify.

Furthermore, an insulation member is provided, said insulating member comprising an elongated insulation member formed of a thermoplastic insulating material, said insulating member having a top edge, a bottom edge, and first and second side, edges; the top edge comprising a protrusion, said top edge extending beyond a corresponding top edge of a corresponding panel of siding; and the bottom edge comprising a ledge, said ledge operable to overlap the protrusion.

In addition, an extruded foamed thermoplastic insulating backerboard is provided.

DETAILED DESCRIPTION

In the description that follows, like parts are marked throughout the specification and the drawings with the same respective reference numerals. The drawings are not necessarily to scale and in some instances proportions may have been exaggerated in order to more clearly depict certain features of the invention.

The present invention discloses both a product and a process relating to foamed siding insulation.
Thermoplastic Siding Insulation The present invention discloses a thermoplastic siding insulation member that provides substantial advantages over the prior art. FIGS. 1 to 4 illustrate the preferred embodiment of a thermoplastic siding insulation member. For clarity, a corresponding vinyl siding panel has been included in the figures.

Figure 1:
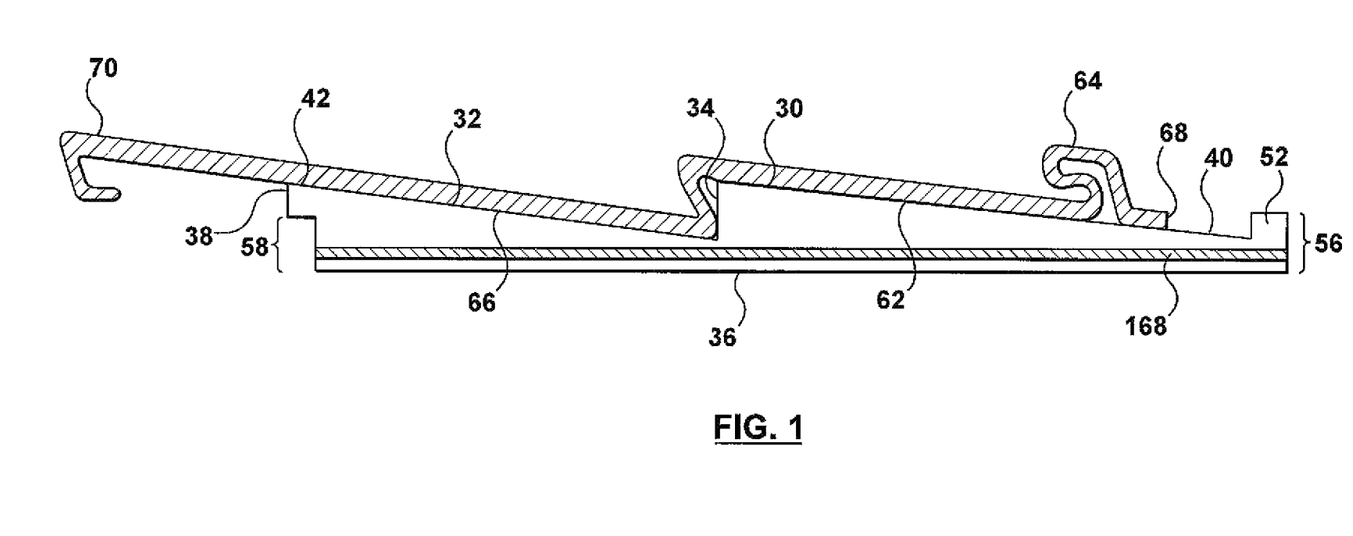
FIG. 1 illustrates a cross sectional view of the preferred embodiment of a thermoplastic insulating member.

FIG. 1 illustrates the cross section of a thermoplastic siding insulation member. The front surface 30 of the cross section of the insulation corresponds to the rear surface 62 of a vinyl siding panel 64 to which the insulation will be adhered. More particularly, the front surface 30 of the thermoplastic siding insulation member includes a plurality of front faces 32, each of which are generally sloping, separated by intermediate or mid-butt edges 34 that connect one face portion to another face portion, corresponding to similar faces on a corresponding rear surface 66 of a vinyl siding panel 64.

The rear surface 36 of the thermoplastic siding insulation member is substantially planar, except for the portion of the rear surface 36 corresponding to the ledge 38, said ledge being described in more particularity below.

As illustrated in FIG. 1, the upper horizontal end 40 of the thermoplastic siding insulation member extends beyond the upper horizontal end 68 of the vinyl siding panel 64 which includes a fastening hem, and which is operable to receive nails or other fastening devices to affix the assembly to the wall of a building or structure. Conversely, the lower horizontal end 70 of the vinyl siding panel 64 extends beyond the lower horizontal end 42 of the thermoplastic siding insulation member. This configuration allows for a staggered overlapping technique whereby the overlap provided by two vertically adjacent vinyl siding panels occurs at a substantial distance from a corresponding overlap provided by two vertically adjacent thermoplastic siding insulation members. Such a configuration provides increased protection from weather elements to a building or structure, and is described in more particularity as follows.

Figure 2:
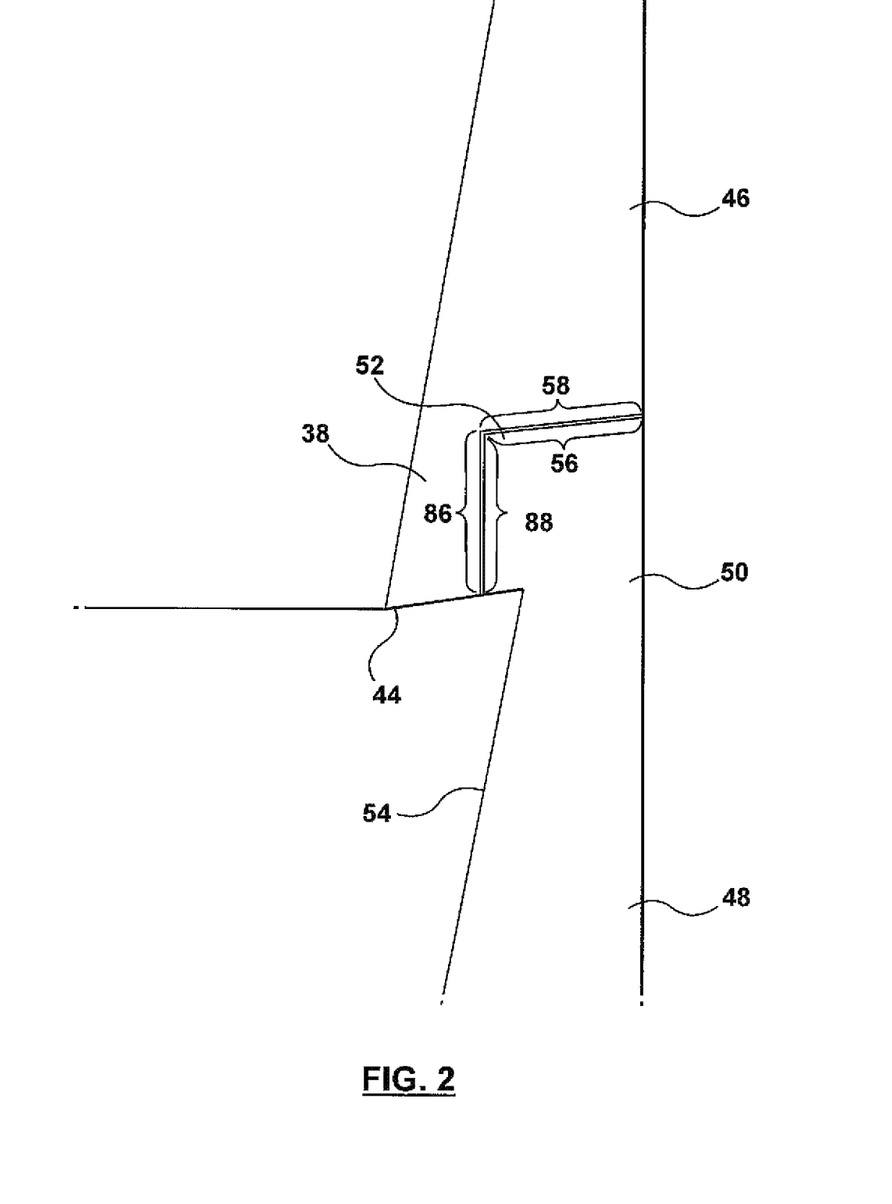
FIG. 2 illustrates the overlap between two vertically adjacent thermoplastic insulating members.

FIG. 2 illustrates two vertically adjacent thermoplastic siding insulation members. The lower horizontal end 42 of the relatively higher thermoplastic siding insulation member 46 overlaps the upper horizontal end 50 of the relatively lower thermoplastic siding insulation member 48. Specifically, the upper horizontal end 50 of the relatively lower thermoplastic siding insulation member 48 forms a raised lip 52 from the upper face 54 of the relatively lower thermoplastic siding insulation member 48. The lower horizontal end 42 of the relatively higher thermoplastic siding insulation member 46 forms a ledge or skirt 38. The distance 58 between the bottom face of the ledge 38 and the rear surface of the relatively higher thermoplastic siding insulation member 46 is approximately equivalent to the distance 56 between the upper face of the raised lip 52 and the rear surface of the relatively lower thermoplastic siding insulation member 48, such that the raised lip 52 and the ledge 38, when arranged in an overlapping manner as illustrated, come into substantial contact or register with one another as shown. Furthermore, the width 88 of the raised lip 52 and the width 86 of the ledge 38 are made substantially equivalent such that, when arranged in an overlapping manner, the relatively higher thermoplastic siding insulation member 46 and the relatively lower thermoplastic siding insulation member 50 appear vertically to comprise a single panel.

Figure 3:
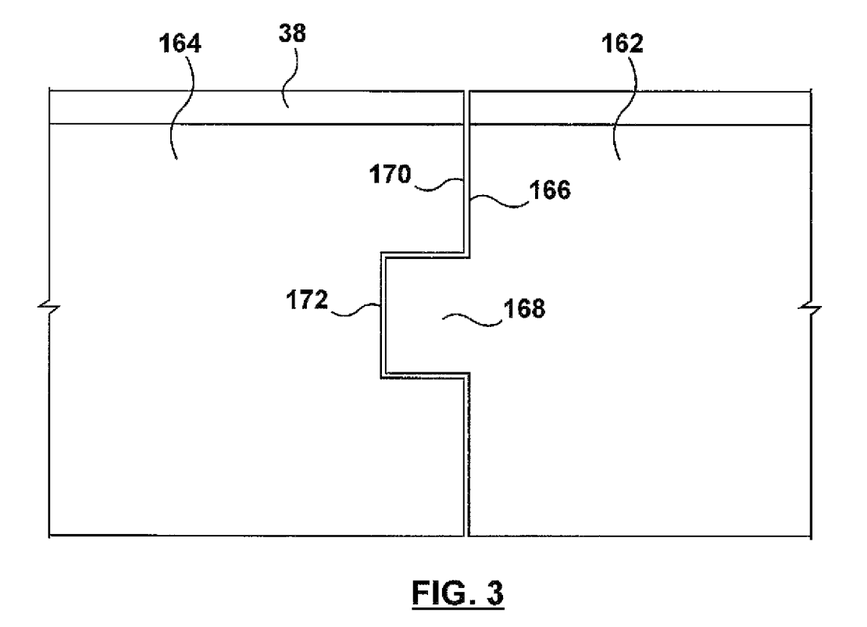
FIG. 3 illustrates the tongue-and-groove joint operable to connect two horizontally adjacent thermoplastic members.

FIG. 3 illustrates the preferred embodiment of the horizontally adjacent arrangement of two members of thermoplastic siding insulation. In this embodiment, one of the two thermoplastic siding insulation members is designated as the receiving member 164 and the second of the two thermoplastic siding insulation members is designated as the protruding member 162.

The protruding member 162 has an edge or tongue 166, being the edge adjacent to the receiving or groove member 164, comprising what is known to those skilled in the art as a tongue joint 168. The tongue joint 168 consists of a protrusion from the otherwise planar surface of the edge 166.

The receiving member 164 has an edge or groove 170, being the edge adjacent to the protruding member 162, comprising what is known to those skilled in the art as a groove joint 172. The groove joint 172 consists of a recession from the otherwise planar surface of the edge 170.

The tongue joint 168 and the groove joint 172 are operable to come into contact such that the joint is resistant to separation in the direction perpendicular to the direction of the joint. In the preferred embodiment, the resistance to separation is provided horizontally, as the joint travels vertically along the edges of the protruding member 162 and receiving member 164.

The dimensions of the tongue joint 168 and the groove joint 172 are preferably determined based on the dimensions of said joints providing the minimum probability of breakage of the joints from the respective thermoplastic insulating members.

Figure 4:
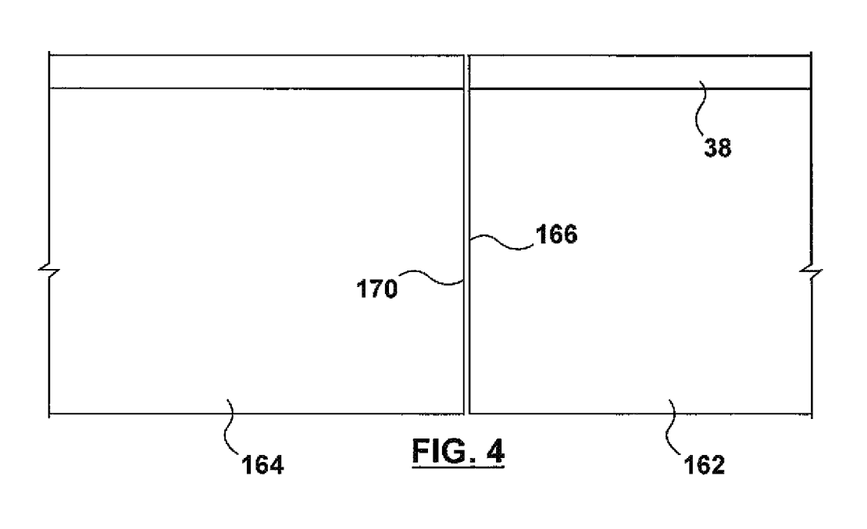
FIG. 4 illustrates the flush joint operable to connect two horizontally adjacent thermoplastic members.

FIG. 4 illustrates an alternate embodiment of the horizontally adjacent arrangement of two members of thermoplastic siding insulation. In this embodiment, the edges 166, 170 of the two members of thermoplastic siding insulation are planar such that when the two members of thermoplastic siding insulation are brought into contact, they abut or share an area of adjacency equivalent to the surface area of the edges 166, 170.

The tongue joint 168 and the groove joint 172 may optionally be introduced on the thermoplastic insulating member by the manufacturer following extrusion of the thermoplastic as described below, by any number of means including cutting, grinding, machining and cutting by hot wire, shaving, or the like.

Since the thermoplastic insulating members may be manufactured to any length as described below, the tongue joint 168 and the groove joint 172 may preferably be introduced on the thermoplastic insulating member by the customer. The tongue joint 168 may be introduced using the device illustrated in FIG. 7a. The device comprises a solid portion or member 102 that may be held by an individual and an open portion 104 that is operable to receive an edge of a thermoplastic insulating member. An inner plane 106 of the device is operable to shave thermoplastic material from the thermoplastic insulating member, by sliding the device along the edge. The lower plane 100 of the device is operable to slide along the rear surface 36 of a thermoplastic insulating member, such that the lower plane 100 acts as a sort of guide plane. The inlet 108 of the device, forming a portion of the open portion 104, is operable to produce a tongue joint 168 on the edge of the thermoplastic insulating member. An individual may introduce a tongue joint 168 on the edge of a thermoplastic insulating member by sliding the device along the edge of the thermoplastic insulating member such that the lower plane 100 of the device slides along the rear surface 36 of the member.

Figure 7A:
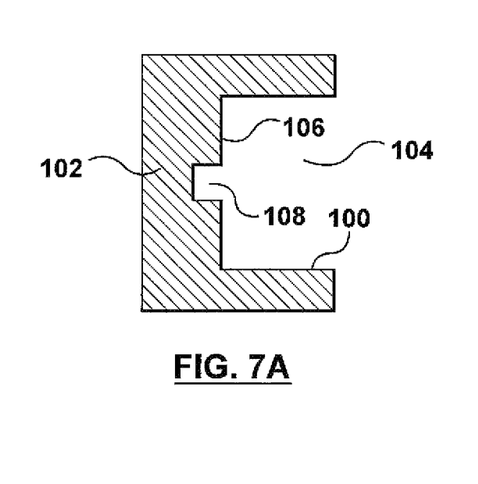
FIG. 7 illustrates a device operable to produce a tongue joint and a device operable to produce a groove joint.
Figure 7B:
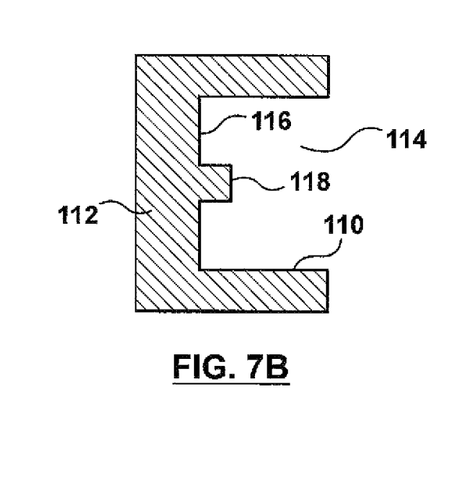

The groove joint 172 may be introduced using the device illustrated in FIG. 7b. The device comprises a solid portion 112 that may be held by an individual and an open portion 114 that is operable to receive an edge of a thermoplastic insulating member. An inner plane 116 of the device is operable to shave thermoplastic material from the thermoplastic insulating member. The lower plane 110 of the device is operable to slide along the rear surface 36 of a thermoplastic insulating member, such that the lower plane 110 acts as a sort of guide plane. The protrusion 118 of the device, forming a portion of the open portion 114, is operable to produce a groove joint 172 on the edge of the thermoplastic insulating member. An individual may introduce a groove joint 172 on the edge of a thermoplastic insulating member by sliding the device along the edge of the thermoplastic insulating member such that the lower plane 110 of the device slides along the rear surface 36 of the member.

Alternatively, standard selected sizes of panel can be manufactured, and if the standard length needs to be cut, one end can be cut and the device used to form the tongue joint 168 or groove joint 172 as needed.

Preferred Thermoplastic Material

A member of thermoplastic siding insulation may preferably be formed using foamed plastic that is generally selected from the group of polystyrene, polypropylene, and polyethylene. In one embodiment a panel of thermoplastic siding insulation comprises a polystyrene with substantially smaller closed cell dimensions than the prior art.

The use of a small closed cell dimension substantially reduces the size and number of voids produced in a styrene foam sheet. Consequently, there is a greatly reduced chance of moisture collection, rotting, and bacteria growth using the product of the present invention than with the prior art.

Adhesion to Siding Panel

A member of thermoplastic siding insulation disclosed by the present invention may be affixed to a panel of siding using an adhesive. The member of thermoplastic siding insulation disclosed by the present invention may be operable to affix to the panel of siding using a permanently flexible adhesive or a rigid adhesive. Regardless of the rigidity of adhesive used, such affixation will reduce or not exhibit the phenomenon of oil-canning.

Furthermore, the member of thermoplastic siding insulation disclosed by the present invention affixed to the panel of siding using a bead or line of adhesive will reduce or not exhibit the phenomenon of telegraphing.

Method for Producing Thermoplastic Siding Insulation

FIG. 1 generally illustrates the extruder 2 for producing a thermoplastic material or product 4 which shall be more fully described herein.

Figure 5:
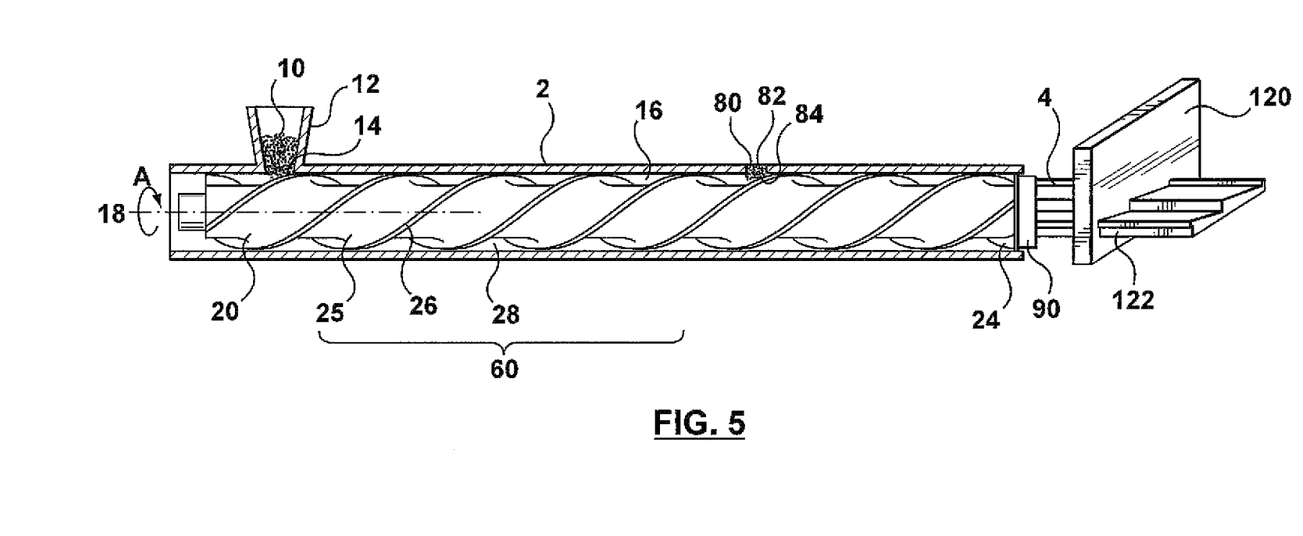
FIG. 5 illustrates the preferred embodiment of a thermoplastic extruder operable to produce a thermoplastic insulating member of variable length.

Generally speaking the polystyrene material starts off as thermoplastic solids 10 which may comprise of pellets or the like that are introduced into a hopper 12 at an input end 14 of the extruder 2. The extruder includes a barrel 16 which extends generally axially along the length of the extruder 2 about an axis 18. The extruder 2 includes a screw conveyer 20 co-axially disposed inside the barrel 16 along the axis 18. The screw conveyer 20 is adapted for relative rotatable movement about the axis 18.

In particular the screw conveyer 20 comprises a core 25 and an external flight or helical screw 26 for defining a passage 28 for conveying thermoplastic solid material 10 from the input end 14 to a thermoplastic melt zone 60 disposed between the input 14 and output 24 so as to melt the thermoplastic solid material 10.

The flights 26 of the screw conveyer 20 are arranged so as to convey the thermoplastic material to the passage 28 from the input 14 to the melt zone generally illustrated as 60 to the output 24 as the screw conveyer 20 rotates in a direction A about the axis 18.

The flights 26 of the screw conveyer 20 also convey melted thermoplastic material from the thermoplastic melt zone to the output 24.

In operation as the screw conveyer 20 rotates along the axis 18 in a direction A thermoplastic solid material 10 is conveyed along the passage 28 from the input end 14 through to the melt zone 60 where the thermoplastic solid material 10 is melted as it is being conveyed to the output end 24. The melted thermoplastic material continues along the passage 28 to the output end 24.

The extruder 2 also includes means 80 for changing the characteristic of the thermoplastic solids 10. The means 80 comprises an aperture 82 which is disposed through the barrel 16 so as permit a user to add thermoplastic modifying material 84 into the melted thermoplastic material. Such means 80 would typically be at the point at which a blowing or foaming agent would be injected to produce the foamed insulating member.

Such means 80 for changing the characteristic of the thermoplastic material can comprise the addition of a substance selected from the group of thermoplastic pigment, dyes, thermoplastic resin, blowing or foaming agents, or other thermoplastic modifiers to the passage 28. For example the thermoplastic pigment may be added through the aperture 80 which is mixed with the melted thermoplastic material so as to change the colour of the melted thermoplastic material. Alternatively ultra violet stabilizers or other thermoplastic resin may be added thereto so as to change the characteristic of the melted thermoplastic material. Alternatively thermoplastic modifiers could be added to change the properties of the melted thermoplastic material.

For example the thermoplastic solid material 10 may comprise of any variety of thermoplastic material which is well known to those persons skilled in the art including polystyrene, polypropylene, and polyethylene. Once the thermoplastic material is melted in the melt zone 60 upstream of the aperture 82 in the passage 28 such melted material would be generally homogeneous. Blowing agents may be added to the extruder 2 in a manner well known to those persons skilled in the art so as to produce an expanded extruded profile that may be cut to length.

Figure 6:
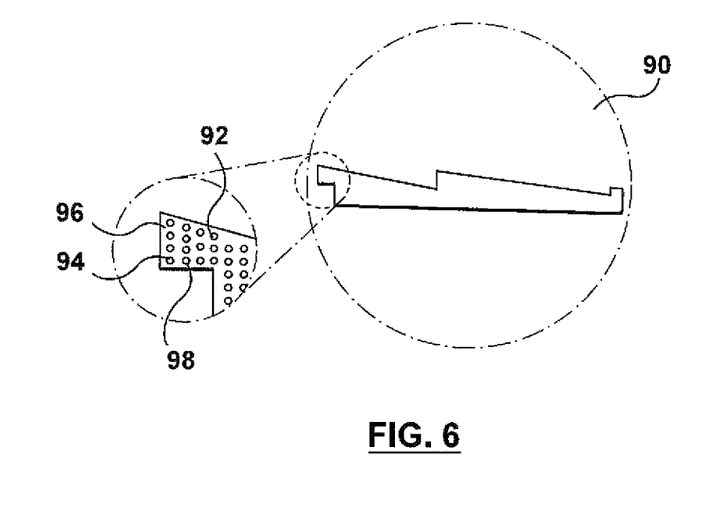
FIG. 6 illustrates the plate assembly of the preferred embodiment of the thermoplastic extruder.

The output end 24 includes a plate assembly 90 which includes a plate opening 92 for communication with the passage 28. The plate assembly 90 may be operable to attach to the output end 24 by a fastening means such as, for example, a threaded attachment allowing the plate assembly 90 to screw onto the output end 24.

More specifically the plate assembly 90 includes a plurality of holes 92 each spaced apart by a distance 96 approximately equivalent to the amount that the material extruded through a hole 94 will expand to come into contact with the material extruded through an adjacent hole 98. The material extruded in each hole may be referred to as a strand. Each strand will naturally form a skin before coming into contact with an adjacent strand, as it exits the plate assembly 90. Since this skinning process occurs prior to the strand becoming fused to adjacent strands, the strength of the foam increases and the moisture absorption of the foam is minimized.

The plurality of holes 94 can be positioned such that the totality of extruded material is outputted from the output end 24 of the extruder 2 in a predetermined shape. The extruded material in the predetermined shape is then passed through a sizing or forming block 120 to smooth the surface of the extruded shape. The sizing or forming block 120 includes a passage 122 that forms the outline of the extruded shape.

The sizing or forming block 120 may preferably be placed approximately 3 inches from the output end 24 of the extruder 2. The sizing or forming block 120 is typically cooled and therefore typically causes the outer surface of the insulating member to form a higher density foam that EPS. Due to this density difference, the insulating member has higher strength than EPS. Each of the plurality of holes 94 may generally be round but could be any shape to facilitate manufacturing of the final shape. Each of the plurality of holes 94 may preferably between 40 and 50 thousandths of an inch in diameter, where they are round.

Furthermore, the extruder 2 can be operated so as to produce a substantially continuous extruded material which generally exits the output 24 as a profile portion the predetermined shape. The continuous extruded material may be produced in any desired length.

The preferred embodiment of the predetermined shape corresponding to the profile of the plurality of holes 92 of the plate assembly 90 is equivalent to the cross section of the thermoplastic siding insulation member illustrated above in FIG. 1.

The temperature of the extruder 2 may be operated in a manner well known to those persons skilled in the art and in one example the hopper temperature may be operated at 105° C. while the heating zone 60 is operated at 160° C. and the output 24 operated at approximately 80° C. These temperatures, however, are given by way of example only and should not be limited to the invention described herein as other operating temperatures may be utilized depending on the thermoplastic material utilized.

During cooling of the extruded thermoplastic insulation through the cooled sizing or forming block 120 an outer skin is developed which has a different density that the inner portion of the insulation. This skin adds strength to the product and provides a barrier to moisture and bacterial growth providing a superior product to the EPS foam backerboard produced by hot wire cutting from large blocks. Furthermore in the EPS method there is substantial waste, smoke, and pollution when the insulating members are cut from solid blocks. Little if any waste is produced from the extruded polystyrene foamed insulation as it is all recycled.

Various embodiments of the invention have now been described in detail.

Since changes in and/or additions to the above-described best mode may be made without departing from the nature, spirit or scope of the invention, the invention is not to be limited to said details.

What is claimed is:

1. An insulation member comprising
an elongated insulation member formed of a thermoplastic insulating material, said insulating member having a top, a bottom, first and second sides and a front and back surface;
said top comprising a lip, said lip extending outwardly from said front surface and presenting a profile with a bottom lip edge;
and said bottom comprising a ledge, said ledge having a recess to receive a lip of a corresponding insulating member, such that the bottom lip edge of said insulating member is co-planar with the bottom of said corresponding insulating member, and the lip fills the recess;
the insulating member comprising a plurality of substantially parallel fibers, each said fibers having a kin contacting adjacent fibers.

2. The insulation member as claimed in claim 1 wherein said first side comprises a protrusion bordered by two planar portions and said second side comprises a receptacle bordered by two planar portions, said receptacle operable to receive said protrusion.

3. The insulation member as claimed in claim 1 wherein each said front face is generally sloping.

4. The insulation member as claimed in claim 1 wherein said insulation member can be disposed vertically adjacent to a second insulation member corresponding to a second panel of siding, and wherein an overlap between said insulation member and said second insulation member is at a substantial distance from an overlap between a corresponding panel of siding and said second panel of siding.

5. The insulation member as claimed in claim 1 wherein said back surface is substantially planar between said top and said ledge.

6. The insulation member as claimed in claim 1 wherein said lip and said ledge extend from said back surface by the same distance.

7. The insulation member as claimed in claim 1 wherein said lip extends from said top, and said ledge extends from said bottom, by the same distance.

8. The insulation as claimed in claim 2 wherein said protrusion and said receptacle are sized to minimize breakage of said protrusion and said receptacle when said insulation member is disposed horizontally adjacent to a second insulation member.

9. The insulating member as claimed in claim 1 comprising polypropylene or polyethylene.

10. Foamed thermoplastic insulating backerboard having a top, a bottom, first and second sides and a front and back surface, the top including a lip extending outwardly from said front surface and having a bottom lip edge; the bottom having a ledge with a recess to receive a lip of a corresponding insulating backerboard, such that the bottom lip edge of the insulating backerboard is co-planar with the bottom of the corresponding insulating backerboard wherein the lip extends from said top and said ledge extends from said bottom by the same distance and the lip fills the recess.

11. The thermoplastic insulating backerboard as claimed in claim 10 comprising polystyrene.

12. The thermoplastic insulating backerboard as claimed in claim 11 wherein said polystyrene comprises closed cells to reduce moisture collection.

13. The thermoplastic insulating backerboard as claimed in claim 11 further comprising a substance added to said thermoplastic, said substance comprising at least one of a pigment, a dye, a thermoplastic resin, a blowing agent, a foaming agent, a thermoplastic modifier, a stabilizer, or any combination thereof.

14. The thermoplastic insulating backerboard as claimed in claim 11 wherein said thermoplastic insulating backerboard has a density higher than expanded polystyrene.

15. The thermoplastic insulating backerboard as claimed in claim 14 wherein said thermoplastic insulating backerboard has a strength higher than expanded polystyrene.

* * * * *